United States Patent [19]

Wiley

[11] 4,320,439

[45] Mar. 16, 1982

[54] COMPACT LAMP UNIT AND SOCKET

[75] Inventor: Emmett H. Wiley, Chesterland, Ohio

[73] Assignee: General Electric Company, Schenectady, N.Y.

[21] Appl. No.: 11,344

[22] Filed: Feb. 12, 1979

[51] Int. Cl.[3] .......... G03B 15/02

[52] U.S. Cl. .......... 362/3; 362/191; 362/198; 362/296; 362/306; 362/368; 362/396; 362/288

[58] Field of Search .......... 362/3, 296, 306, 288, 362/368, 399, 191, 198, 396, 8, 16, 18; 329/45 T

[56] References Cited

U.S. PATENT DOCUMENTS

| | | | |
|---|---|---|---|
| 3,003,058 | 3/1961 | Babcock | 362/3 |
| 3,314,331 | 4/1967 | Wiley | 362/296 |
| 3,502,864 | 3/1970 | Wagner | 362/306 |
| 3,639,745 | 2/1972 | Saiki | 362/296 |
| 4,100,592 | 7/1978 | Henkel et al. | 362/191 |

*Primary Examiner*—J. L. Barr
*Attorney, Agent, or Firm*—Norman C. Fulmer; Lawrence R. Kempton

[57] ABSTRACT

A compact lamp unit and associated socket for use in a projection system such as a slide projector, microfilm viewer, and so forth. The lamp unit includes a reflector molded from a plastic material and an electric lamp secured within the reflector. In order to decrease the axial dimension of the reflector and to avoid the use of pin connectors, electrical contacts for the lamp are pressed into recesses formed in the outer surface of the reflector. The reflector includes an opening at its apex through which electrical leads from the lamp extend outwardly of the reflector. The electrical leads are secured to the contacts by being forced into the recesses along with the contacts. This construction technique is fast and simple.

The lamp unit also includes a handle to enable a heated lamp unit to be replaced by the user and a guide means to enable the lamp unit to be oriented quickly and accurately upon insertion into the socket. In their preferred forms, the handle and the guide means are identically configured and comprise fins extending outwardly of the convex surface of the reflector, the fins lying on opposite sides of the opening and in the same plane.

The socket into which guide means is inserted includes a first upstanding member defining a reference plane against which a portion of the reflector is engaged in use. A second upstanding structure engages another portion of the reflector to securely retain the reflector when it is inserted into the socket. The socket includes a pair of flexible contacts engageable with the contacts carried by the lamp unit, the socket contacts being positioned in a plane substantially parallel with the reference plane. When the lamp unit is inserted into the socket, the socket contacts are flexed sufficiently to make good electrical contact with the contacts carried by the lamp unit. A retention mechanism in the form of a flexible bail may be used to prevent inadvertent displacement of the lamp unit from the socket.

48 Claims, 11 Drawing Figures

COMPACT LAMP UNIT AND SOCKET

CROSS REFERENCE TO RELATED PATENTS AND APPLICATION

1. PHOTOGRAPHIC PROJECTION SYSTEM AND LAMP, U.S. Pat. No. 3,314,331, issued Apr. 18, 1967 to Emmett H. Wiley, here the "First Projection Lamp Patent," the disclosure of which is incorporated by reference.

2. RIM-REFERENCING LAMP-HOLDER AND PROJECTION LAMP WITH REFLECTOR, U.S. Pat. No. 3,502,864, issued Mar. 24, 1970 to Donald M. Wagner, here the "Second Projection Lamp Patent," the disclosure of which is incorporated by reference.

3. ELECTRIC INCANDESCENT LAMP, U.S. Pat. No. 2,883,571, issued Apr. 21, 1959 to Elmer G. Fridrich and Emmett H. Wiley, here the "Halogen Lamp Patent," the disclosure of which is incorporated by reference.

4. REFLECTOR, design patent application Ser. No. 11,474, filed concurrently.

BACKGROUND OF THE INVENTION

1. Field of the Invention

The present invention relates generally to projection lamps and, more particularly, to a compact projection lamp which is easily inserted into, and removed from, a socket.

2. Description of the Prior Art

Various electrical devices such as slide projectors, microfilm viewers, motion picture projectors, and so forth, employ an electric lamp as a light source to project a beam of light onto a film and thereafter to project an image onto a screen. These devices may be referred to generally as "projection systems" and the light sources used in projection systems may be referred to as "projection lamps." Projection systems also include a reflector disposed in proximity with the projection lamp to concentrate the light emitted by the lamp and focus the light into a beam. The beam of light is projected outwardly of the reflector along an axis, here termed the "optical axis." As long as the shape of the reflector remains constant, and so long as the lamp is not moved with respect to the reflector, the optical axis always is fixed with respect to the reflector.

Early projection systems employed relatively large electric lamps as the light source. Due to the size of the lamps, the reflectors also were quite large. Certain reflectors were made of glass having a silvered light-reflective coating. These glass reflectors were expensive to manufacture. Other reflectors were made of metal and, although not as expensive to manufacture as glass reflectors, these metal reflectors still were very large. The size of either glass or metal reflectors particularly was a serious limitation on the compactness of the overall projection system.

With the development of lamps operating on the so-called halogen regenerative cycle (see the Halogen Lamp Patent), advances have been made in reducing the size of the lamp and, hence, the reflector associated with the lamp. Advances also have been made in the composition and manufacture of the reflectors themselves. Because projection lamps are rigidly secured to the associated reflectors and because lamps and reflectors are employed in combination to project a beam of light, a combined lamp/reflector hereafter will be referred to where appropriate as a "lamp unit."

The First and Second Projection Lamp Patents describe commercially available lamp units. In these lamp units, the reflector is made in a cup-like, ellipsoidal shape and the lamp is secured within the concave portion of the reflector near the apex of the reflector. The reflector includes a base portion extending rearwardly from the apex of the reflector. The base portion includes an opening through which electrical leads extend to provide electric current to the lamp. In order to transmit electrical current to the lamp, pin connectors are secured to the leads. The pin connectors extend outwardly of the base portion and are adapted to engage electrical contacts carried in an appropriately configured socket. The lamp, electrical leads, and pin connectors are fixed with respect to the reflector by means of cement which fills the space between the base of the lamp and the reflector, as well as the opening in the base portion.

The foregoing arrangement of components does not address certain problems. Although the lamp units are much smaller than previous lamp units, they still extend an appreciable distance along the optical axis (from the front of the reflector to the rearwardmost end surface of the base portion). The pins extending outwardly of the base portion further increase this axial dimension. Projection systems are being made smaller than ever before, and the size of the lamp units presently avialable has compromised efforts to reduce the overall size of projection systems.

Another concern not addressed by prior lamp units is the connection between the cement and the reflector. This connection often is inadequate if the lamp and/or pin connectors are stressed. This concern arises, in part, because a typical present-day reflector employed with a lamp unit is made of a molded thermoplastic or thermoset material such as phenolic. Presently available cements suitable for use in lamp units are sufficiently poor that an extremely strong bond cannot be maintained with the material from which the reflector is made. Accordingly, the pin connections often are loosened merely by inserting the lamp unit into the socket or by inadvertent mishandling of the lamp unit prior to insertion into the socket.

A further consideration with the present day lamp units is that of replacing a defective lamp unit. Certain projection systems such as movie projectors require that the filament of the lamp lie in a predetermined plane, such as a horizontal plane or a vertical plane. Accordingly, the angular orientation of the lamp unit with respect to the projection system must be controlled. The positioning of the optical axis is critical, and thus the orientation of the reflector with respect to the projection system must be controlled. If a lamp should burn out during operation, it should be convenient to replace the lamp unit rapidly for minimum disturbance. Even though the heat developed by a lamp unit can be substantial, it is important that the lamp unit can be removed without requiring the operator to wait for it to cool. Moreover, when a new lamp unit is inserted into the projection system, the lamp unit should be capable of being inserted into the projection system with a minimum of difficulty and with quick, accurate orientation of the filament and the reflector.

SUMMARY OF THE INVENTION

The present invention overcomes the foregoing and other drawbacks of prior art proposals by providing a new and improved compact lamp unit and associated socket. The invention completely obviates problems relating to inadequate bonds between various components of the lamp unit and the reflector. The lamp unit is capable of being readily inserted into, and withdrawn from, the socket.

In accordance with the preferred practice of the present invention, a lamp unit includes an ellipsoidal reflector, the reflector having (a) a concave light-reflective portion defining an optical axis, (b) an exterior surface, (c) a rim at the front of the reflector, the rim lying in a plane positioned in a predetermined relationship with respect to the optical axis and defining a first reference plane, and (d) an opening at an apex at the rear of the reflector. An electric lamp is disposed within the reflector and, when energized, generates a beam of light projected by the reflector along the optical axis. Electrical contacts are secured to the exterior surface of the reflector. Electrical leads extend from the electric lamp through the opening at the apex of the reflector and are connected to the contacts. Consequently, the lamp unit occupies a relatively small axial dimension and pin connectors are not required.

In a preferred embodiment, the contacts are substantially flush with the surface of the reflector and are positioned symmetrically with respect to the optical axis. The contacts may be rivet-like "button contacts" adapted to be pressed into complementary recesses formed in the exterior surface of the reflector. If desired, spaced formations may project outwardly of the exterior surface of the reflector and the electrical contacts may be secured to the formations. Desirably, each formation includes a mounting portion lying in a plane positioned parallel to the first reference plane and an electrical contact is secured to the mounting portion. A smoothly contoured transition surface connects the mounting portion to the exterior surface of the reflector, the transition surface thus forming an extension of the surface defined by the mounting portion. By this construction, a smooth, ramp-like surface provides a transition from the surface of the reflector to the mounting portion to which the contact is secured.

A feature of the invention is that it enables a heated lamp unit to be removed at once from a projection system and replaced by a new lamp unit without waiting for the heated lamp unit to cool. The invention permits insertion of a new lamp unit without difficulty in aligning the filament and the reflector with respect to the projection system. These advantageous results are brought about by providing a handle for the lamp unit, the handle in preferred form comprising a fin projecting outwardly of the convex surface of the reflector and lying in a plane perpendicular to the first reference plane. The fin is sufficiently thin that it remains cool at all times, thus permitting a heated lamp unit to be handled.

A guide means also may be provided for the lamp unit to assist in positioning the lamp unit in a desired orientation. The guide means in preferred form comprises a second fin projecting outwardly from the exterior surface of the reflector and lying in a plane perpendicular to the first reference plane. The guide means is engagable with a portion of a socket so as to align the lamp unit with respect to the projection system. Because the lamp and, hence, the filament, is fixed with respect to the reflector, and because the second fin is fixed with respect to the reflector, orientation of the second fin thereby orients the filament. In the preferred embodiment, the first and second fins are identically configured and are disposed in the same plane. The fins are located on opposite sides of the optical axis and the optical axis extends in the plane in which the fins lie. If the fins are located as described, the handle and the guide means are interchangeable.

An important aspect of the present invention is that it enables lamp units to be assembled quickly. This advantage, in part, is brought about by a relatively short base portion projecting outwardly of the exterior surface of the reflector, the base portion being disposed at the apex of the reflector and including an opening aligned with the optical axis. The base portion includes apertures (preferably slots) extending laterally outwardly from the optical axis. The electrical leads are adapted to pass through the apertures and to be connected to the electrical contacts.

The electrical contacts preferably are positioned on opposite sides of the base member in alignment with the apertures. By this construction, the electrical leads during assembly can be passed through the opening in the base portion, through the apertures, and placed in a position adjacent recesses in the reflector. Thereafter, button contacts can be pressed into the recesses carrying with them the electrical leads. The assembly is fast and simple.

The present invention also contemplates a socket to be used to support the lamp unit properly with respect to the projection system. The socket includes a first structure against which the rim of the reflector is engaged in use, the first structure providing a second reference plane disposed in a predetermined orientation with respect to components of the projection system. The first and second reference planes are coincident when the lamp unit is in use. The socket also includes a second structure spaced from the first structure, the second structure adapted to engage a portion of the reflector spaced rearwardly from the rim of the reflector. The lamp unit thus is rigidly secured with respect to the projection system upon being inserted between the first and second structures. In this position, the reference planes are coincident and the optical axis is located as desired.

The socket also includes resilient electrical contacts. The socket contacts lie in a plane substantially parallel with the second reference plane and engage the electrical contacts carried by the lamp unit. The socket electrical contacts are biased toward the second reference plane so that, upon insertion of the lamp unit into the socket, the socket contacts will be flexed slightly. This enhances the electrical contact between the socket contacts and the lamp unit contacts. If desired, the socket contacts also can function as the second structure provided the contacts are made strong enough.

The socket also includes a guide means adapted to cooperate with the guide means included as part of the lamp unit. The guide means includes a portion aligned with the path the lamp unit traverses as the lamp unit is inserted into the socket. By way of example, the guide means may comprise a slot engageable with a projecting portion (such as the second fin) included as part of the lamp unit. Accordingly, the lamp unit cannot be inserted into the socket until the fin and the slot are aligned. This simple expedient properly orients the lamp unit and makes misalignment impossible.

Another embodiment of the socket includes a retention mechanism for securely holding the lamp unit in place within the socket. The retention mechanism is movable to permit the lamp unit to be removed and replaced readily. In preferred form, the retention mechanism comprises a bail extending from the first structure, the bail being sufficiently flexible that it can be pressed aside when a lamp unit is inserted into, or removed from, the socket. After the lamp unit is in place within the socket, the bail can be moved back into place to engage the lamp unit and hold the lamp unit within the socket.

By utilizing some or all of the features of the present invention, it now is possible to incorporate a compact, easy to assemble lamp unit in a projection system. The lamp unit can be removed and replaced with ease, without waiting for the lamp unit to cool and without alignment problems. These advantages and a fuller understanding of the invention described and claimed in the present application may be had by referring to the following description and claims, taken in conjunction with the accompanying drawings.

DESCRIPTION OF THE PREFERRED EMBODIMENT

Figure 1:
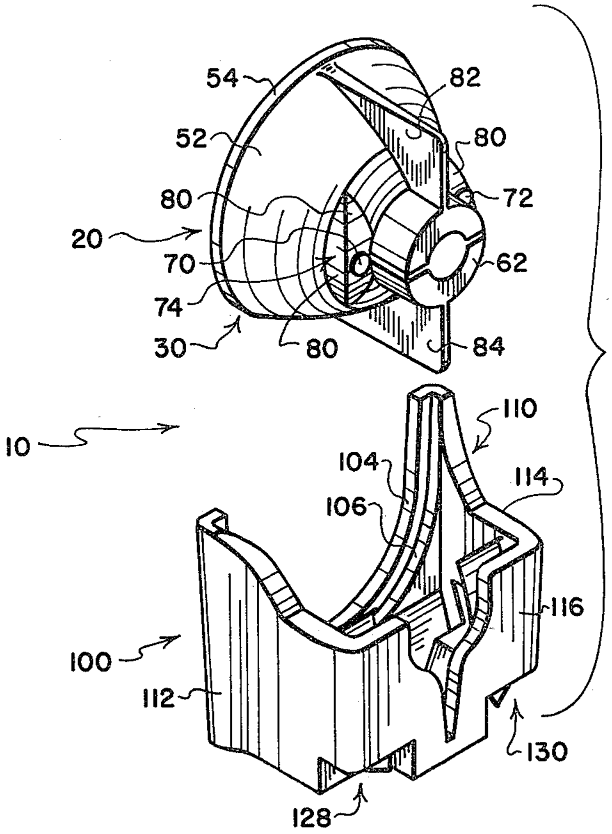
FIG. 1 is an exploded, perspective view of a compact lamp unit and socket produced in accordance with the invention.
Figure 2:
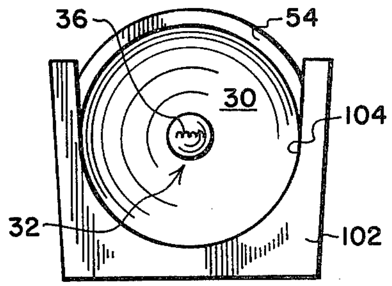
FIG. 2 is a front elevational view of the lamp unit of FIG. 1 inserted in place within the socket of FIG. 1.

Referring to FIGS. 1–5, a combined lamp unit and socket is indicated generally by the numeral 10. The assembly includes a lamp unit 20 and a socket 100 into which the lamp unit 20 is insertable.

The lamp unit 20 includes a reflector 30 of ellipsoidal shape, having a light source 32 disposed at or near its near focus. The light source 32 is an electrical lamp having a transparent bulb 34 within which a coiled filament of tungsten wire 36 is disposed. The filament 36 is secured within the bulb 34 by legs 38, 40 which extend into a base seal region 42 of the bulb 34. Lead wires 44, 46 also extend into the base seal region 42 and are in electrical contact with the legs 38, 40, respectively.

The bulb 34 is filled with an inert gas such as argon or krypton, and a quantity of a halogen, such iodine or bromine. As explained more fully in the Halogen Lamp Patent, blackened bulb walls are avoided by the well-known halogen regenerative cycle. The small size of the bulb 34 avoids obstruction of light reflected from the reflector 30 which otherwise would have to pass through a larger bulb a second time.

The reflector 30 includes a concave, light-reflective surface 50, a convex exterior surface 52, an annular rim 54, and an apex 56 having an opening 58. The opening 58 is aligned with the optical axis 59 of the reflector 30, indicated in FIGS. 3 and 5 by a dotted line. The annular rim 52 defines a reference plane located in a predetermined, fixed relationship with respect to the optical axis 59. In the preferred embodiment, the plane within which the rim 54 lies is perpendicular to the optical axis 59.

The reflector 30 also includes a base portion 60 extending rearwardly of the reflector 30 from the apex 56. The base portion 60 is cylindrical. The base portion 60 includes a rearwardmost end surface 62. The base portion 60 also includes an opening 64 aligned with the opening 58 and, hence, the optical axis 59. The base portion 60 additionally includes a pair of apertures, or slots 66, 68. The slots 66, 68 open through the end surface 62 and into the opening 64. The slots 66, 68 extend in a plane parallel to that in which the optical axis 59 lies to a depth near the apex 56. Although the slots 66, 68 are illustrated as lying in the same plane on opposite sides of the optical axis 59, the slots 66, 68 can be positioned differently, if desired. When the slots 66, 68 are aligned in the same plane, however, they may be thought of as a single slot extending completely across the base portion 60.

The reflector 30 includes a pair of spaced electrical contacts 70, 72. The contacts 70, 72 are secured to the convex exterior surface 52 of the reflector 30. In the embodiment illustrated, the reflector 30 includes a pair of spaced formations 74, 76 located on either side of the optical axis 59. The formations 74, 76 are located symmetrically with respect to the optical axis 59 and are placed adjacent the apex 56 near that point where the base portion 60 extends outwardly of the reflector 30. Each formation 74, 76 includes a mounting portion 78 to which the electrical contacts 70, 72 are secured. The mounting portion 78 is disposed in a predetermined relationship with respect to the optical axis 59, preferably in a plane parallel to that defined by the rim 54. Each formation 74, 76 also includes a transition surface 80 providing a smoothly contoured transition from the mounting portion 78 to the covex surface 52. A transition surface 80 extends outwardly from each mounting portion 78 in two opposed directions. The convex surface 52, the mounting portion 78, and the transition surfaces 80 combine to create a relatively smooth ramp-like transition from the exterior surface 52 to the mounting portion 78.

Each mounting portion 78 includes a recess 79 complementary to the electrical contacts 70, 72. The electrical contacts 70, 72 and the recesses 79 are sized such that the contacts 70, 72 are secured to the reflector 30 by a force fit. As will be described subsequently, the lead wires 44, 46 are forced into the recesses 79 by the contacts 70, 72 to create a good electrical connection without the use of cement. The lead wires 44, 46 also can be secured to the contacts 70, 72 by soldering or crimping, although a press fit is preferred because of simplicity and speed of assembly.

The contacts 70, 72 sometimes are referred to as "button" contacts because only the button-like head of the otherwise rivet-like contact is exposed. Even though the electrical contacts can be provided in various configurations, it is expected that the exposed portions of the contacts 70, 72 will be substantially flush with the convex surface 52, and the mounting portion 78 in particular. In the preferred embodiment, the formations 74, 76 and their associated electrical contacts 70, 72 are spaced laterally outwardly of the optical axis 59, and symmetrically with respect to the optical axis 59. The contacts 70, 72 preferably are aligned with the slots 66, 68 and are positioned at approximately that level to which the slots 66, 68 extend into the base portion 60.

The reflector 30 includes a handle 82 by which the lamp unit 20 can be manipulated by the user. The handle 82 is in the form of a thin fin projecting outwardly of the convex surface 52 and extending rearwardly of the reflector 30 the same distance as the base portion 60. Because the reflector 30, including the fin 82, is molded of a plastic material, the insulating characteristics of the fin 82 are excellent. Moreover, because the fin 82 is thin, its heat-dissipative qualities are enhanced. Accordingly, the fin 82 serves as an excellent insulator from heat generated by the lamp unit 20 as well as a handle for manipulating the lamp unit 20.

The reflector 30 also includes a guide means 84. The guide means 84 is in the form of a thin fin extending outwardly of the convex surface 52 and extending rearwardly of the reflector 30 the same distance as that of the base portion 60. The second fin 84 is identical in configuration to the first fin 82 and is positioned in the same plane as the first fin 82, although the fins 82, 84 are disposed on opposite sides of the optical axis 59. It is expected that the plane in which the first and second fins 82, 84 lies will be coincident with the optical axis 59 and perpendicular to the first reference plane defined by the annular rim 54. Because the filament 36 is fixed with respect to the lamp 34, and because the lamp 34 is fixed with respect to the reflector 30, orientation of the guide means 84 results in orientation of the filament 36. Because the first and second fins 82, 84 are identical and lie in the same plane on opposite sides of the optical axis 59, the first and second fins 82, 84 are interchangeable and either may function as a handle or as a guide means.

Figure 6:
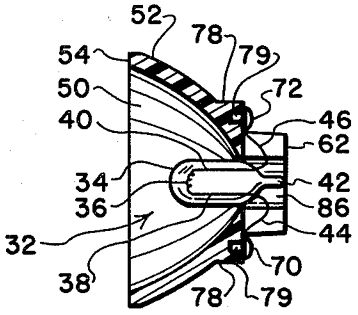
FIG. 6 is a cross-sectional view of the lamp unit taken along line 6—6 of FIG. 4, showing details of the reflector and the lamp secured within the reflector.

Referring now to FIG. 6, the lamp 32 is secured to the reflector 30 by means of cement 86. The cement may be a commercially available silicone-based cement manufactured by the General Electric Company and known as RTV. The cement 86 joins the lamp 32 near its base portion to the apex 56 of the reflector 30 at the opening 58. The cement 86 also fills the opening 64 included as part of the base portion 60. In the embodiment illustrated in FIG. 7, a smaller, lower-wattage lamp 32' is employed with the reflector 30. A sleeve-like adaptor 88 permits the smaller lamp 32' to be attached to the reflector 30 near the apex 56. The adaptor 88 itself is secured to the reflector 30 by means of cement 86 and the lamp 32' is secured to the adaptor 88 by more of the cement 86. The adaptor 88 includes a pair of opposed slots 90, 92. The slots 90, 92 are adapted to be aligned with the slots 66, 68 included as part of the base portion 60. By this construction, lead wires 44', 46' extending from a base seal region 42' of the lamp 32' may extend outwardly of the base portion 60 to be connected to the electrical contacts 70, 72.

The socket 100 includes a first structure 102. The structure 102 is engaged by the rim 54 of the reflector 30 in use. In order to permit a beam of light to be projected outwardly from the reflector 30, the structure 102 includes a generally U-shaped aperture 104. The structure 102 also includes on its back face a ledge 106 against which the rim 54 of the reflector 30 can be placed. The ledge 106 ensures that the rim 54 is tightly pressed against the structure 102.

The structure 102 defines a reference plane disposed in a predetermined orientation with respect to components of the projection system. Because the rim 54 is engaged with the structure 102 in use, the reference planes defined by the rim 54 and the structure 102 are coincident when the lamp unit 20 is in use.

The socket 100 also includes a second structure 110 spaced from the first structure 102 and adapted to engage a portion of the reflector 30 spaced rearwardly from the rim 54. In the embodiment illustrated, the second structure 110 comprises a first sidewall 112, a second sidewall 114, and a rear wall 116 connecting the sidewalls 112, 114. Preferably, the entire socket 100 is molded as a unit from a plastic material. Accordingly, the structure 102, the sidewalls 112, 114, and the rear wall 116 are connected into a rigid assembly into which the lamp unit 20 can be inserted.

Each sidewall 112, 114 includes an inwardly tapered portion 118. The inwardly tapered portion 118 engages a portion of the convex surface 52 of the reflector 30. By this construction, upon insertion of the lamp unit 20 into the socket 100, the lamp unit 20 is retained securely between the structure 102 (including the ledge 106) and the inwardly extending portion 118 of the sidewalls 112, 114.

Figure 4:
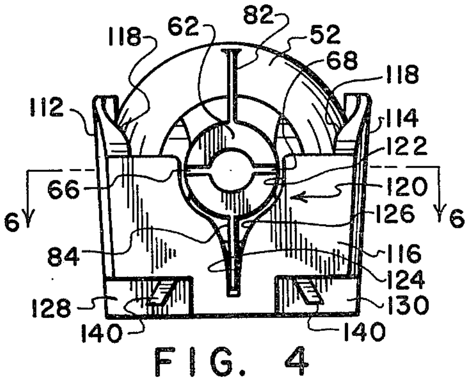
FIG. 4 is a rear elevational view of the lamp unit and socket of FIG. 1.
Figure 5:
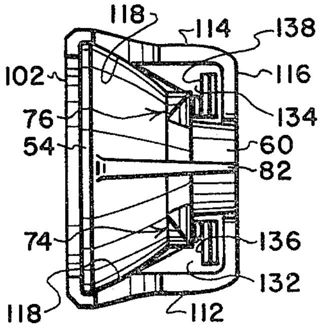
FIG. 5 is a plan view of the lamp unit and the socket of FIG. 1.

The rear wall 116 includes a guide means 120 by which the lamp unit 20 can be oriented properly upon insertion into the socket 100. The guide means 120 is in the form of a large aperture 122 extending completely through the rear wall 116 near the upper surface of the rear wall 116. A slot 124 extends comletely through the rear wall 116 and is aligned with the path which the lamp unit 20 traverses as the lamp unit 20 is inserted into the socket 100. The aperture 122 and the slot 124 are connected by a contoured transition surface 126. Referring particularly to FIG. 4, upon insertion of the lamp unit 20 into the socket 100, the second fin 84 extends into the aperture 122 and downwardly into the slot 124. Due to the size of the aperture 122, the base portion 60 of the reflector 30 can be accommodated within the socket 100. The smoothly contoured transition surface 126 permits the fin 84 to be fitted into the slot 124 even if the fin 84 is slightly askew during the initial stages of the insertion operation.

Figure 3:
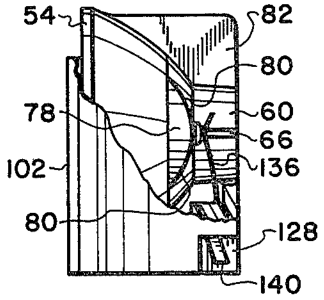
FIG. 3 is a side elevational view, with parts broken away and removed, of the lamp unit and socket of FIG. 1.

The sidewalls 112, 114 and the rear wall 116 are undercut at the corners as indicated at 128, 130. Apertures 132, 134 open through the undercut portions 128, 130, respectively. A pair of flexible, elongate electrical contacts 136, 138 are disposed within the socket 100. The contacts 136, 138 include a lower portion 140 adapted to extend through the apertures 132, 134. Referring particularly to FIGS. 3 and 4, the lower portions 140 can be twisted after the contacts 136, 138 have been inserted in the apertures 132, 134 and the contacts 136, 138 will be securely retained in place.

The contacts 136, 138 lie in a plane substantially parallel to the reference plane defined by the structure 102. The contacts 136, 138 are inclined slightly toward the structure 102. Upon insertion of the lamp unit 20 into the socket 100, the contacts 136, 138 will be flexed to that positon shown in FIG. 3 and good electrical contact between the lamp unit contacts 70, 72 and the socket contacts 136, 138 will be attained. If the contacts 136, 138 are made strong enough, they can serve as the second structure 110 to (a) hold the lamp unit 20 in place and (b) make the required electrical connection with the contacts 70, 72.

The transition surface 80 included as part of the formations 74, 76 ensures that the contacts 136, 138 will be pushed to that position shown in FIG. 3 with little difficulty. Relative motion between the contacts 70, 72 and the contacts 136, 138 is such that the contacts 70, 72 actually are pushed into even firmer engagement with the reflector 30 as the lamp unit 20 is inserted into the socket 100. Because the transition surfaces extend on opposite sides of the mounting portion 78, and because the fins 82, 84 are identically configured, the lamp unit 20 can be inserted into the socket 100 in either of two orientations. Taken together, the foregoing features permit the lamp unit 20 to be inserted into, and removed from, the socket 100 with little or no difficulty in aligning the lamp unit 20 and with virtually no chance that the electrical contacts 70, 72 will be loosened or otherwise adversely affected.

An alternative embodiment of the invention as illustrated in FIGS. 8–11. This embodiment of the invention largely is identical with the embodiment already described, except that the socket 100 is modified slightly from that configuration illustrated in FIGS. 1–5. In the embodiment illustrated in FIGS. 8–11, the socket 100 includes a retention mechanism 150 for securing the lamp unit 20 in place within the socket 100. The retention mechanism 150 is movable to permit the lamp unit to be removed and replaced readily. The retention mechanism 150 comprises a bail extending upwardly from the first structure 102. The bail 150 comprises a portion 152 spaced above the uppermost surface of the structure 102. The portion 152 is supported in this position by legs 154, 156 extending from the structure 102. A pair of rearwardly extending legs 158, 160 provides support for the legs 154, 156. The sidewalls 112, 114 include openings (not shown) into which depending portions of the legs 158, 160 are press-fitted. It will be apparent that the bail 150 is sufficiently flexible that it can be pressed aside when a lamp unit 20 is inserted into, or removed from, the socket 100. After the lamp unit 20 is in place within the socket 100, the bail can be moved back into place to engage the lamp unit 20 behind the rim 54 and hold the lamp unit 20 within the socket 100.

The embodiment of FIGS. 8–11 also differs from that illustrated in FIGS. 1–5 in that the rear wall 116 includes a single aperture 162 tapering smoothly from the upper surface of the wall 116 to a point near the lower portion of the wall 116. The aperture 162 functions in the same manner as does the aperture 120, the slot 124, and the transition surface 126 taken together.

ASSEMBLY OF THE LAMP UNIT 20

Figure 7:
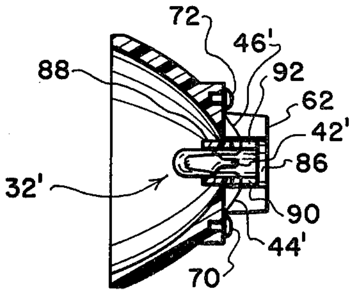
FIG. 7 is a cross-sectional view similar to FIG. 6, wherein a sleeve-like adaptor is used to secure a small lamp within the reflector.
Figure 8:
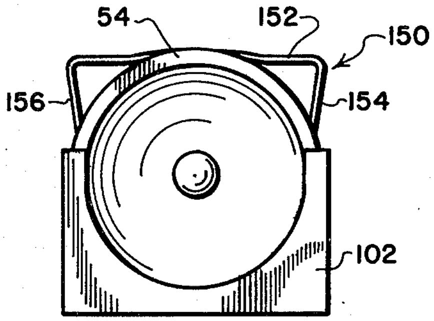
FIG. 8 is a view of an alternative embodiment of the invention, in which a bail is included as part of a socket to assist in retaining a lamp unit in place.
Figure 9:
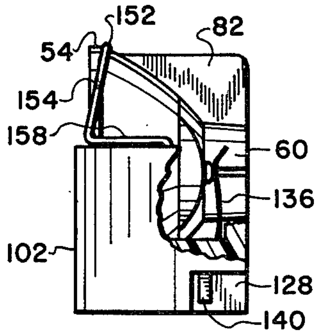
FIG. 9 is a side elevational view, with parts broken away and removed, of the socket of FIG. 8.
Figure 10:
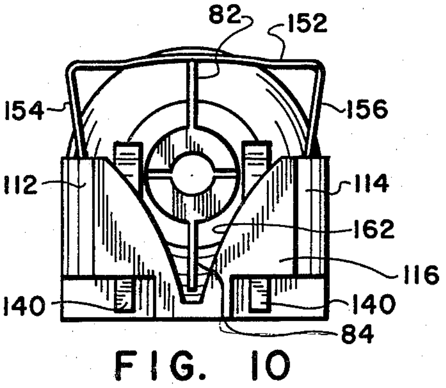
FIG. 10 is a rear elevational view of the socket of FIG. 8.
Figure 11:
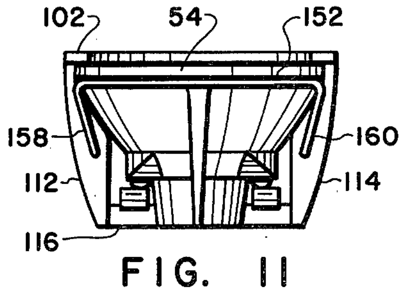
FIG. 11 is a plan view of the socket of FIG. 8.

Assembly of the lamp unit 20 will be explained by reference to FIG. 6, it being understood that assembly of a lamp unit like that in FIG. 7 would be substantially identical. Assembly is carried out as follows:

1. The lamp 32 is positioned within the concave portion 50 of the reflector 30 and held in that position illustrated in FIG. 6.

2. The lead wires 44, 46 are passed through the openings 58, 64 and are extended laterally outwardly through the slots 66, 68.

3. The lead wires 44, 46 are positioned adjacent the recesses 90, 92.

4. The rivet-like button contacts 70, 72 are forced into the recesses 90, 92. The contacts 70, 72 are pressed into the recesses 90, 92 to depth such that the contacts are substantially flush with the mounting portion 78. By this construction, the lead wires 44, 46 are maintained in tight engagement with the contacts 70, 72 and the contacts 70, 72 are tightly secured to the reflector 30.

5. Cement 86 is placed into the opening 64 until the opening 64 is completely filled. After the cement 86 has dried, the lamp unit 20 is ready for use. If desired, a decorative decal (not shown) can be affixed to the end surface 62 of the base portion 60, but such a decal is not necessary to assembly or operation of the lamp unit 20.

Although the invention has been described in its preferred form with a certain degree of particularity, it is understood that the present disclosure of the preferred form has been made only by way of example and that numerous changes in the details of construction and the combination and arrangement of parts may be restored to without departing from the true spirit and scope of the invention as hereinafter claimed. It is intended that the patent shall cover, by suitable expression in the appended claims, whatever features of patentable novelty exist in the invention disclosed.

What is claimed is:

1. A compact lamp unit especially adapted for use in a projection system such as a slide projector, microfilm viewer, and so forth, the lamp unit being characterized by a relatively small axial dimension and by a lack of pin connectors, comprising:
   - (a) an ellipsoidal reflector, the reflector having a concave light-reflective portion defining an optical axis, an exterior surface, and an apex at the rear of the reflector;
   - (b) an electric lamp disposed within the reflector, the electric lamp having electrical leads, the electric lamp when energized generating a beam of light projected by the reflector along the optical axis; and,
   - (c) electrical contacts secured to the exterior surface of the reflector, the electrical leads being connected to the contacts.

2. The compact lamp unit of claim 1, wherein the contacts are substantially flush with the surface of the reflector.

3. The compact lamp unit of claim 1, wherein the contacts are positioned symmetrically with respect to the optical axis of the relector.

4. The compact lamp unit of claim 1, further comprising spaced formations projecting outwardly of the exterior surface of the reflector, each formation including a mounting portion lying in a plane positioned in a predetermined, fixed relationship to the optical axis of the reflector, an electrical contact being secured to each mounting portion and lying substantially flush with the surface of the mounting portion.

5. The compact lamp unit of claim 4, wherein the formations are positioned symmetrically with respect to the optical axis of the reflector.

6. The compact lamp unit of claim 3 or 4, wherein each formation includes a smoothly contoured transition surface connecting the mounting portion and the exterior surface of the reflector, the transition surface forming an extension of the surface defined by the mounting portion.

7. The compact lamp unit of claim 4, wherein the plane in which the mounting portions lie is positioned perpendicular to the optical axis.

8. The compact lamp unit of claim 1, further comprising a handle by which the lamp unit can be positioned, the handle projecting outwardly from the exterior surface of the reflector, the handle defined by a first fin lying in a plane positioned in a predetermined relationship with respect to the optical axis.

9. The compact lamp unit of claim 8, further comprising a guide means projecting outwardly from the exterior surface of the reflector for positioning the lamp unit in a desired orientation, the guide means defined by a second fin lying in a plane positioned in a predetermined relationship with respect to the optical axis.

10. The compact lamp unit of claim 9, wherein the first and second fins lie in the same plane.

11. The compact lamp unit of claim 10, wherein:

(a) the optical axis extends in the same plane in which the first and second fins lie; and, (b) the first and second fins are on opposite sides of the optical axis.

12. The compact lamp unit of claim 1, further comprising an opening at the apex of the reflector, the electrical contacts being located laterally outwardly of the opening and the electrical leads extending through the opening to be connected to the electrical contacts.

13. The compact lamp unit of claim 12, wherein the opening is aligned with the optical axis.

14. The compact lamp unit of claim 13, wherein the lamp is secured within the opening, whereby the lamp is positioned in a predetermined, fixed relationship with respect to the optical axis.

15. The compact lamp unit of claim 14, wherein the lamp is secured within the opening by cement.

16. The compact lamp unit of claim 14, wherein the lamp is fitted within a sleeve-like adaptor and the adaptor is secured within the opening by cement.

17. The compact lamp unit of claim 1, wherein a base portion extends outwardly of the exterior surface of the reflector, the base portion disposed at the apex of the reflector and including an opening aligned with the optical axis.

18. The compact lamp unit of claim 17, wherein the base portion includes apertures extending laterally outwardly from the optical axis, the electrical leads passing through the apertures.

19. The compact lamp unit of claim 18, wherein the apertures comprise slots extending from the end surface of the base portion to a depth substantially flush with the surface in which the contacts lie.

20. The compact lamp unit of claim 19, wherein the slots lie in a common plane and the optical axis extends in the common plane.

21. The compact lamp unit of claim 17, wherein:

(a) the lamp is disposed within the opening with the rear portion of the lamp terminating at, or slightly forwardly of, the end surface of the base portion;

(b) the base portion includes a slot, the slot extending completely across the base portion, the slot opening through the end surface of the base portion and extending to a depth substantially flush with the surface in which the contacts lie, the slot also lying in a plane extending through the opening; and, (c) the electrical leads extend laterally outwardly of the opening through the slot, one lead being located on either side of the opening.

22. The compact lamp unit of claim 21, wherein the optical axis extends in the plane in which the slot lies.

23. The compact lamp unit of claim 21, wherein the contacts are located:

(a) adjacent the outer surface of the base portion;

(b) on opposite sides of the base portion; and, (c) in alignment with the slot.

24. The compact lamp unit of claim 1, wherein the exterior surface is convex.

25. A method of assembling a lamp unit adapted for use in a projection system, the lamp unit including a reflector, electrical contacts, and an electric lamp disposed within the reflector, the reflector including an opening at or near its apex through which electrical leads from the electric lamp extend, comprising:

(a) passing the electrical leads outwardly of the opening;

(b) securing the electrical leads to the contacts; and, (c) securing the contacts to the reflector at the exterior thereof.

26. The method of claim 25, wherein the step of securing the contacts to the reflector is accomplished by pressing the contacts into recesses in the reflector.

27. A method of assembling a lamp unit adapted for use in a projection system, the lamp unit including a reflector and an electric lamp disposed within the reflector, the reflector including an opening at or near its apex through which electrical leads from the electric lamp extend, comprising:

(a) providing a pair of spaced recesses in the exterior surface of the reflector;

(b) passing the electrical leads outwardly of the opening and adjacent the recesses; and, (c) pressing rivet-like electrical contacts into the recesses and into contact with the electrical leads.

28. The method of claim 27, wherein a force fit is created between the contacts and the electrical leads.

29. The method of claim 27, comprising the additional step of pressing the rivet-like contacts into the recesses in the reflector to such an extent that the surface of the contacts is substantially flush with the surface of the reflector.

30. The method of claim 27, comprising the additional step of securing the lamp and the electrical leads to the reflector by means of cement placed in the opening.

31. A method of assembling a lamp unit adapted for use in a projection system, the lamp unit including a reflector, contacts, and an electric lamp disposed within the reflector, the reflector including an opening at or near its apex through which electrical leads from the electric lamp extend, the reflector also including a base portion extending rearwardly from the apex of the reflector, the base portion having an opening aligned with the opening in the reflector and apertures extending laterally outwardly of the opening, comprising:

(a) passing the electrical leads outwardly of the openings in the reflector and the base portion;

(b) securing the electrical leads to the contacts; and, (c) securing the contacts to the reflector at its exterior.

32. The method of claim 31, wherein the additional step of securing the contacts to the reflector is accomplished by pressing the contacts into recesses formed in the reflector.

33. A method of assembling a lamp unit adapted for use in a projection system, the lamp unit including a reflector and an electric lamp disposed within the reflector, the reflector including an opening at or near its apex through which electrical leads from the electric lamp extend, the reflector also including a base portion extending rearwardly from the apex of the reflector, the base portion having an opening aligned with the opening in the reflector and apertures extending laterally outwardly of the opening, comprising:
(a) providing a pair of spaced recesses in the exterior surface of the reflector;
(b) passing the electrical leads outwardly of the openings and through the apertures in the reflector and the base portion and adjacent the recesses; and,
(c) pressing rivet-like electrical contacts into the recesses and into contact with the electrical leads.

34. The method of claim 33, wherein a force fit is created between the contacts and the electrical leads.

35. The method of claim 33, comprising the additional step of pressing the rivet-like contacts into the recesses in the reflector to such an extent that the surface of the contacts is substantially flush with the surface of the reflector.

36. The method of claim 33, comprising the additional step of securing the lamp and the electrical leads to the reflector by means of cement placed in the openings in both the reflector and the base portion.

37. In a projection system, a lamp unit for projecting a beam of light and a socket into which the lamp unit can be inserted, comprising:
(a) an ellipsoidal reflector, the reflector having a concave light-reflective portion defining an optical axis, an exterior surface, and an apex at the rear of the reflector;
(b) an electric lamp disposed within the reflector, the electric lamp having electrical leads, the electric lamp when energized generating a beam of light projected by the reflector along the optical axis;
(c) electrical contacts secured to the exterior surface of the reflector, the electrical leads being connected to the contacts;
(d) said socket comprising a first structure against which the forwardmost portion of the lamp unit is engaged in use, the first structure providing a reference plane disposed in a predetermined orientation with respect to the optical axis;
(e) second structure spaced from the first structure, the second structure adapted to engage a portion of the lamp unit spaced from the forwardmost portion of the lamp unit, the lamp unit thereby being rigidly secured with respect to the reference plane upon being disposed between the first and second structures; and,
(f) electrical contacts carried by the socket, the socket contacts lying in a plane substantially parallel with the reference plane and engaging the electrical contacts secured to the surface of the reflector upon insertion of the lamp unit into the socket.

38. The system of claim 37, further comprising spaced formations projecting outwardly of the exterior surface of the reflector, each formation including a mounting portion lying in a plane positioned in a predetermined, fixed relationship with respect to the optical axis of the reflector, an electrical contact being secured to each mounting portion and lying substantially flush with the surface of the mounting portion, the plane in which the mounting portion lies being positioned substantially parallel with the plane in which the socket contacts lie.

39. The system of claim 38, further comprising a transition surface connecting the mounting portion of each formation to the exterior surface of the reflector, whereby a ramp-like transition is created to permit the lamp unit to be inserted easily into the socket.

40. The system of claim 37, further comprising guide means for aligning the lamp unit in a predetermined angular orientation with respect to the socket, the guide means including coacting structure included as part of both the lamp unit and the socket, the coacting structure aligned with the path traversed by the lamp unit when the lamp unit is being inserted into the socket.

41. The system of claim 40, wherein the guide means comprises:
(a) a slot included as part of the second structure; and,
(b) a projecting portion carried by the lamp unit, the projecting portion adapted to slide within the slot upon proper orientation of the lamp unit with respect to the socket.

42. The system of claim 37, further comprising a handle extending outwardly from the lamp unit, the handle permitting the lamp unit to be removed from the socket even when the lamp unit is heated.

43. The system of claim 42, wherein the handle comprises a fin lying in a plane positioned in a predetermined relationship with respect to the optical axis.

44. The system of claim 37, further comprising a retention mechanism to retain the lamp unit securely within the socket.

45. The system of claim 44, wherein the retention mechanism comprises a flexible bail movable into and out of a position blocking movement of the lamp unit with respect to the socket.

46. The compact lamp unit of claim 1, in which said reflector has an optical opening at the front thereof, and in which said electrical contacts are secured to said exterior surface of the reflector at locations spaced rearwardly from said front optical opening.

47. The compact lamp unit of claim 7, in which said reflector has an optical opening at the front thereof, and in which said mounting portions are spaced rearwardly from said front optical opening.

48. The compact lamp unit of claim 47, in which said mounting portions face rearwardly with respect to said front optical opening.

* * * * *